March 3, 1959  O. J. GIBSON  2,875,729
CAGED BIRD FEEDER
Filed Oct. 18, 1954

INVENTOR.
OSCAR J. GIBSON
BY
Knox & Knox

United States Patent Office 2,875,729
Patented Mar. 3, 1959

2,875,729
CAGED BIRD FEEDER

Oscar J. Gibson, Spring Valley, Calif.

Application October 18, 1954, Serial No. 462,994

2 Claims. (Cl. 119—52)

The present invention relates generally to automatic feeding devices and more particularly to a caged bird feeder.

The primary object of this invention is to provide a bird feeder in which a container of bird seed is supported in an upright position and provision is made to meter the flow of seed from the container as required to meet the demand.

Another object of the invention is to provide perches in fixed spaced relation to the part of the feeder where the feed is exposed and made available, thus preventing scattering and waste, as well as making the device more acceptable to the birds.

Another object of this invention is to provide a bird feeder comprising a simple open frame to hold a seed container, and a feed tray fixed to the stand to retain the seed in accessible position.

Another object of this invention is to provide a bird feeder which is stable and difficult to upset and which is designed further to prevent undue scattering of the feed.

Another object of this invention is to provide a caged bird feeder which is adapted for fabrication from many different materials, so that the choice of material can be according to the dictates of availability and price considerations, the exact sizes and proportions being matters easily determined to suit particular conditions and needs.

Another object of this invention is to provide a caged bird feeder which is inexpensive and practicable to manufacture.

Finally, it is an object to provide a bird feeder of the aforementioned character which is simple and convenient to use, and which will give generally efficient and durable service.

With these and other objects definitely in view, this invention consists in the novel construction, combination and arrangement of elements and portions, as will be hereinafter fully described in the specification, particularly pointed out in the claims, and illustrated in the drawing which forms a material part of this disclosure and wherein similar characters of reference indicate similar or identical elements and portions throughout the specification and throughout the views of the drawing, and in which:

Figure 1:
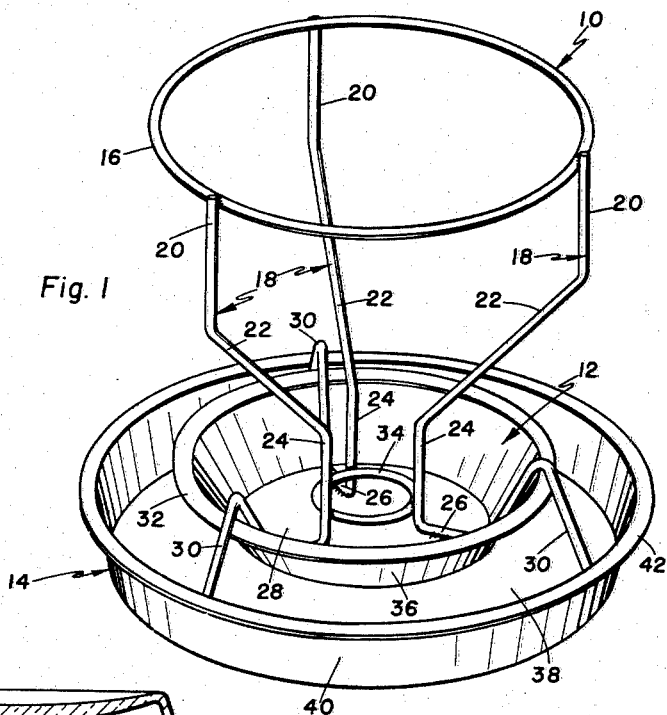
Fig. 1 is a perspective view of the bird feeder.

Referring now to the drawing, the bird feeder comprises, in brief, a frame 10 secured at its lower end in a feed pan 12, the assembly being mounted in a catch pan 14.

The frame 10 comprises an upper support ring 16 to which are fixed a plurality of circumferentially spaced legs 18 extending downwardly therefrom. Each leg 18 is formed from a single piece of rod, wire or the like, and includes an upper upright portion 20, the end of which is attached directly to the support ring 16, an inwardly and downwardly sloping portion 22 and a lower upright portion 24. Also, extending radially outwardly from the lower upright portion 24 is a horizontal base portion 26 which is fixed to the bottom inner surface 28 of the feed pan 12. An inverted V-shaped foot 30 is unitary with and extends radially outwardly of the base portion 26. This foot 30 arches upwardly over the rim portion of the feed pan which constitutes an inner perch 32 for smaller birds while feeding. The lower upright portions 24 are fixed at circumferentially spaced positions to a lower stop ring 34 which is spaced slightly above the feed pan bottom 28.

The feed pan 12 is of metal or other substantially rigid material and has a generally flat bottom 28 and an upwardly sloping annular wall 36, the upper edge of which is folded to constitute the inner perch 32.

The catch pan 14 has a flat bottom 38, an upwardly extending annular wall 40 and a rim portion which comprises the outer perch 42. The frame 10 rests inside the catch pan 14 which is of such a size that the lower ends 44 of the feet are disposed adjacent the junction of the bottom 38 and the wall 40. The lower ends 44 need not be secured to the catch pan unless desired. The frame 10 is prevented from undue lateral displacement within the catch pan 14, whether or not the ends 44 are fixedly secured.

Figure 2:
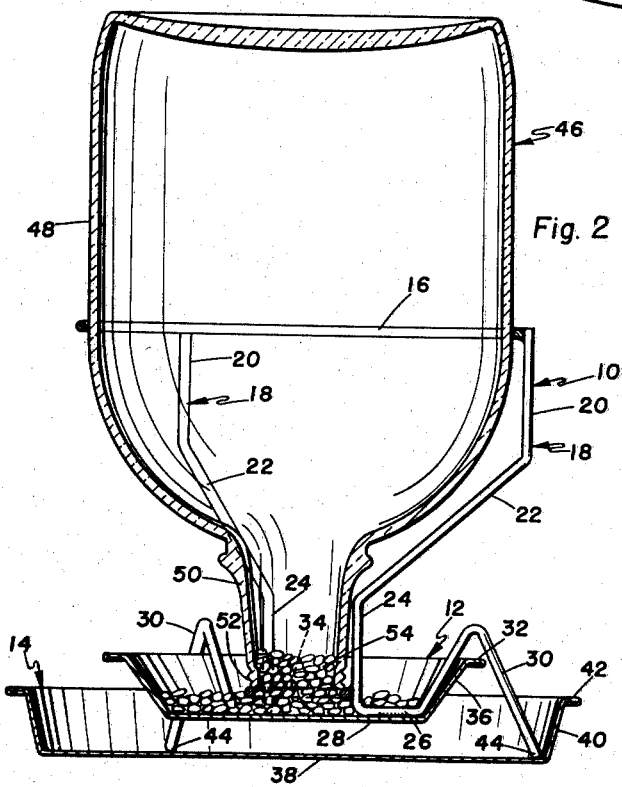
Fig. 2 is a vertical sectional view thereof with a container of bird seed shown in position.

The container used with the device is preferably a conventional bottle 46 of suitable size, a one gallon bottle being particularly suitable. The main body 48 of the bottle 46 is held within the support ring 16, while the neck 50 extends downwardly between the lower upright portions 24 so that the rim 52 rests on the stop ring 34, as in Fig. 2. The bottle 46 is thus held slightly above the feed pan 12, so allowing the bird seed, indicated at 54, to flow from the bottle and fill the feed pan up to the level of the rim 52. For obvious reasons more seed will flow from the bottle as that in the feed pan is consumed so that the supply of birdseed will remain constant at this level until the bottle 46 is emptied. The birds support themselves on the perches 32 and 42 to reach the food and the catch pan 14 retains any food dropped by the birds to prevent unnecessary scattering.

The structure of the device is extremely simple and may be made in various sizes to suit particular requirements. The actual shape of the legs 18 is critical to the extent that only points of contact with the feed pan 12 are at the base portions 26, the feet 30 being shaped to clear the sloping wall 36 of the feed pan and inner perch 32 to facilitate more thorough periodic cleaning and sterilization.

I claim:

1. A bird feeder comprising a frame having an upper support ring; a plurality of downwardly extending legs fixed to said support rings; each leg being unitary and including an upper upright portion, an inwardly sloping portion, a lower upright portion, a horizontally extending base portion, and an inverted V-shaped foot unitary with said base portion; a feed pan fixed to said base portions; said feet extending outwardly and arching over the periphery of said feed pan; the ends of said feet depending below the feed pan.

2. A bird feeder comprising a frame having an upper support ring; a plurality of legs fixed to said support ring and extending downwardly therefrom; said legs converging downwardly; said legs having lower ends and horizontally extending base portions at their lower ends; a feed pan having a bottom fixed to said base portions; and feet of generally inverted V-shape unitary with said base portions and arching over said wall; the ends of said feet depending below said feed pan; a stop ring fixed to and between said legs and slightly spaced above said feed pan and constituting a stop for the extremity of the neck of a feed container bottle; said feed pan also having an inner perch comprising the top portion of said wall; a catch pan having a bottom and a sloping wall; said frame being disposed in said catch pan with said feet adjacent the juncture of the bottom and the sloping wall.

References Cited in the file of this patent

UNITED STATES PATENTS

| | | |
|---|---|---|
| 1,801,932 | Miller | Apr. 21, 1931 |
| 1,994,859 | Langum | Mar. 19, 1935 |
| 2,144,174 | Zaloudek | Jan. 17, 1939 |
| 2,278,047 | Van Fleet | Mar. 31, 1942 |
| 2,364,991 | Marshall | Dec. 12, 1944 |